May 3, 1927.
L. D. HUBBARD
CULINARY UTENSIL
Filed March 27, 1926
1,627,285
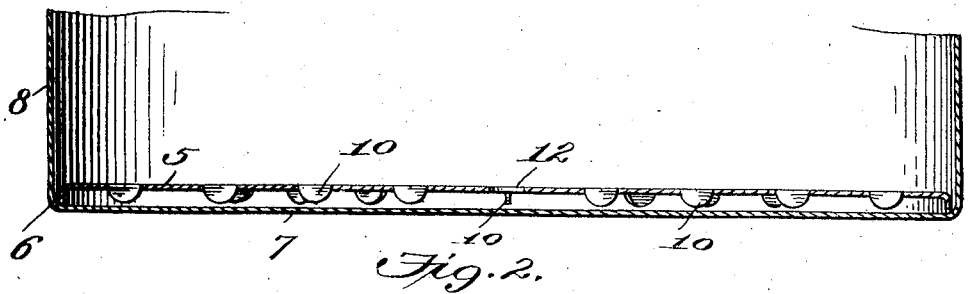
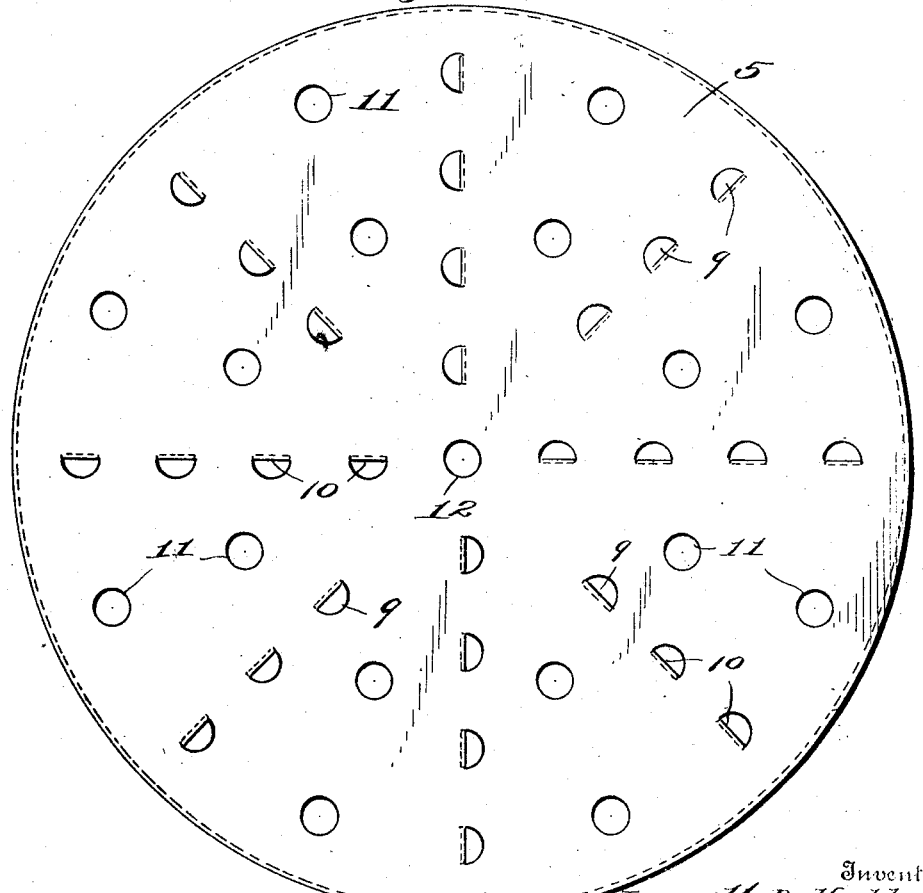
Inventor
Lemott D. Hubbard
By
Attorney Patented May 3, 1927.

1,627,285

UNITED STATES PATENT OFFICE.

LEMOTT D. HUBBARD, OF UTICA, NEW YORK.

CULINARY UTENSIL.

Application filed March 27, 1926. Serial No. 97,971.

This invention relates to improvements in culinary utensils and more particularly to a pot or pan protector in the form of a false bottom which is introduced in the utensil to prevent burning of the contents.

The main object of the present invention is to provide a device of the class specified having structural features which will prevent the same from becoming bent or buckled by the weight of the contents of the utensil in which the device is disposed, not only at intermediate points or throughout the area of the device but also at the rim or edge of the same, the improved protector or false bottom also having perforations therein that will permit circulation of the liquid portion of the contents of the utensil and thereby advantageously affect the cooking of the said contents.

With the foregoing and other objects and advantages in view, the invention consists in the preferred construction and arrangement of the several parts which will be more fully hereinafter described and claimed.

In the drawing:

Fig. 1 is a transverse vertical section of the bottom portion of a culinary utensil showing the improved device disposed on the bottom thereof within the utensil and also illustrated in transverse section.

Fig. 2 is a top plan view of the improved device or false bottom.

In the accompanying drawing the false bottom or support for the contents of a culinary utensil for the purposes hereinbefore specified is shown as of circular form. It will be understood, however, that the form of the device may be modified in shape to correspond to the general contour of the utensil in which it is disposed and also may be modified in dimensions for use in large or small utensils.

The improved device preferably consists of a circular disk 5 of non-corrosive sheet metal and having a surrounding depending flange 6, which serves to support the improved device and hold the same mainly spaced from the bottom 7 of the cooking utensil 8. The particularly novel features embodied in the present form of protector or false bottom consist in diametrically intersecting, semicircular apertures 9 having the metal released by forming said apertures bent down at right angles to provide semicircular guards 10, which have their maximum depending portions normally above the upper surface of the bottom 7 of the cooking utensil but which will contact with the said bottom when the weight of the contents of the utensil bearing on the disk 5 is great enough to force the said guards downwardly without depressing or buckling the complete disk to any material extent, thereby providing a space between the bottom 7 and the disk 5 for the circulation of the liquid contents of the utensil and advantageously affecting the cooking of the material or contents resting or supported on the improved device. These intermediate circular guards cooperate with the surrounding depending flange 6 to maintain the space between the bottom of the cooking utensil and the disk or body of the improved device without resorting to the more complex structure usually adopted and consisting of legs or feet which are separately secured to the disk or body. The guards 10 in accordance with the present invention are formed from a part of the disk body and disposed in the manner above specified, and at the same time the apertures or openings provide for circulation of the liquid portion of the contents of the cooking utensil. By this means the structure of the improved device is materially cheapened and the cost of production correspondingly decreased. In addition to the semi-circular openings, other openings 11 are formed between the lines of apertures or openings 9, so as to facilitate free circulation of the liquid portion of the contents of the cooking utensil.

It will be seen that the semi-circular apertures 9 as well as the additional circular openings 10 are disposed in regular order, or each set of openings are in radial relation to the center of the disk or body 5, a single circular opening 12 being formed in the center of the disk.

The material or metal from which the disk or body 5 is formed may be varied in thickness, but owing to the supporting means therefor provided by the surrounding angular flange 6 and the depending semi-circular guards 10, comparatively thin sheet metal may be used in the formation of the improved protector or false bottom.

The improved protector or false bottom may be readily fitted in and removed from a cooking utensil, and the general construction of the improved device is such that it may be easily cleaned after service.

What is claimed as new is:

As an improved article of manufacture, a bottom protector for food in culinary vessels comprising a sheet metal disk having semicircular openings formed therein in radial lines with the metal released by the formation of said openings turned downwardly at right angles to provide intermediate guards, the disk also having a peripheral depending angular supporting flange of greater vertical extent than the downwardly bent guards so that the latter have their lower terminals normally above the bottom of the receptacle on which the protector is disposed to provide a free circulation of liquid within the culinary vessel between the protector and the bottom of said vessel under normal conditions, the guards only acting under maximum weight conditions to obviate extreme depression of the body of the disk, other circular openings being formed between the said semicircular openings and disposed in radial lines.

In testimony whereof I have hereunto set my hand.

LEMOTT D. HUBBARD.